(12) United States Patent
Yamauchi et al.

(10) Patent No.: US 8,197,557 B2
(45) Date of Patent: Jun. 12, 2012

(54) METHOD FOR PRODUCING A SECONDARY CELL HAVING FLAT WOUND ELECTRODE BODY

(75) Inventors: Yasuhiro Yamauchi, Hyogo (JP); Tomokazu Yamanaka, Sumoto (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 120 days.

(21) Appl. No.: 12/712,700

(22) Filed: Feb. 25, 2010

(65) Prior Publication Data

US 2010/0146776 A1   Jun. 17, 2010

Related U.S. Application Data

(62) Division of application No. 11/269,880, filed on Nov. 9, 2005, now Pat. No. 7,695,530.

(30) Foreign Application Priority Data

Nov. 12, 2004 (JP) ................. 2004-329614
Oct. 27, 2005 (JP) ................. 2005-312913

(51) Int. Cl.
*H01M 4/82* (2006.01)
*H01M 6/10* (2006.01)
*H01M 6/12* (2006.01)

(52) U.S. Cl. ............ 29/623.1; 429/94; 429/162

(58) Field of Classification Search ............ None
See application file for complete search history.

(56) References Cited

U.S. PATENT DOCUMENTS

| | | |
|---|---|---|
| 4,559,700 A | 12/1985 | Sugalski et al. |
| 5,344,724 A | 9/1994 | Ozaki et al. |
| 5,658,683 A | 8/1997 | Kageyama et al. |
| 5,746,780 A | 5/1998 | Narukawa et al. |
| 2004/0232882 A1* | 11/2004 | Yanagawa et al. ............ 320/112 |
| 2005/0123824 A1 | 6/2005 | Ishikawa et al. |

FOREIGN PATENT DOCUMENTS

| | | | |
|---|---|---|---|
| CN | 1140909 A | | 1/1997 |
| JP | 11-121044 A | | 4/1999 |
| JP | 11-176476 A | | 7/1999 |
| JP | 2002-184636 | * | 6/2002 |
| JP | 2003-157888 A | | 5/2003 |
| JP | 2003-338307 A | | 11/2003 |

OTHER PUBLICATIONS

IPDL PAJ JPO machine translation for JP 2002-184636, Kato, Jun. 2002.*
Chinese Examiner's Summary of Observation of CN 1140909A.

* cited by examiner

*Primary Examiner* — Barbara Gilliam
*Assistant Examiner* — Adam A Arciero
(74) *Attorney, Agent, or Firm* — Westerman, Hattori, Daniels & Adrian, LLP

(57) ABSTRACT

A method for producing a secondary cell having a flat wound electrode body that inhibits the bending of the electrode board caused by charging and discharging and inhibits resulting swelling of the cell and deterioration of cycle characteristics is provided. The method has the steps of: winding, with a winding core, a positive electrode board, a negative electrode board, and a separator provided between the positive and negative electrode boards, and fixing the winding end, thereby preparing an approximately cylindrical electrode body; after the step of preparing the electrode body, deforming the electrode body into a shape with an approximately oval cross section by pressing the approximately cylindrical electrode body from a direction perpendicular to the winding axis, and rotating the deformed electrode body in the winding direction, thereby relaxing the winding state; and after the relaxation steps, pressing the electrode body into the flat wound electrode body.

4 Claims, 11 Drawing Sheets

- PRIOR ART -

- PRIOR ART -

- PRIOR ART -

(a)   (b)

METHOD FOR PRODUCING A SECONDARY CELL HAVING FLAT WOUND ELECTRODE BODY

CROSS-REFERENCE TO RELATED APPLICATIONS

This is a divisional application of U.S. patent application Ser. No. 11/269,880, filed on Nov. 9, 2005, currently pending, which claims the benefit of priority from the prior Japanese Patent Application Nos. 2004-329614, filed on Nov. 12, 2004 and 2005-312913 filed on Oct. 27, 2005, the entire contents of which are incorporated herein by references.

BACKGROUND OF THE INVENTION

1) Field of the Invention

The present invention relates to a method for producing a secondary cell having a flat wound electrode body that inhibits the bending of the electrode board caused by charging and discharging, and resulting swelling of the cell and deterioration of cycle characteristics.

2) Description of the Related Art

In recent years, there has been a rapid reduction in the size and weight of mobile information terminals such as mobile phones, notebook personal computers, and PDAs. Secondary cells and batteries, which are the driving power sources of such terminals, are required to be easily mounted inside the mobile information terminals, and easy to exert a large amount of current from.

Non-aqueous electrolyte secondary cells such as lithium-ion secondary cells, which have square outer casings or laminate outer casings in which flat wound electrode bodies are housed, are easily mounted inside mobile information terminals and easy to exert a large amount of current from because of a large area of facing between the positive and negative electrodes. Thus, such non-aqueous electrolyte secondary cells are useful as the driving power sources of mobile information terminals.

In such non-aqueous electrolyte secondary cells, the positive and negative electrode boards repeat swelling and contraction because of intercalation and deintercalation of lithium ions through charging and discharging. The adhesive (adhesive tape) that fixes the winding end of the flat wound electrode body restricts the swelling and contraction of the electrode boards. As shown in FIG. 8, this causes the swelling of the electrode boards toward the inside of the flat wound electrode body, which in turn causes bending of the electrode boards. The bending of the electrode boards has presented the problem of increasing the thickness of the cell. In addition, at the bent portion, a gap occurs between the positive electrode board and negative electrode board. At this gap the smooth movement of lithium ions are interrupted, presenting the problem of increased deterioration of cycle characteristics.

In order to solve these problems, the following attempt is being made. By using a winding core having a flat (oval, polygonal, and the like) cross section, and by reducing the tension applied on the electrode boards at the time of winding, a space is provided between the electrode boards of the flat wound electrode body so that the space adsorbs the swelling of the electrode boards, thus attempting to inhibit the bending of the electrode boards. However, since the cross section of the winding core is flat, there is a problem that the speed of winding needs to be reduced compared with the case of a circular cross section for the winding core. In addition, since the tension applied on the electrode boards is small, there is a problem of a reduction in the quality of winding (the electrode boards and separator are easily displaced when wound).

Techniques related to the non-aqueous electrolyte secondary cell are proposed in patent documents 1 to 4, and the outlines are as follows.

Patent Document 1: Japanese Patent Application Publication No. 2003-157888 (claims and paragraphs 0005-0009).
Patent Document 2: Japanese Patent Application Publication No. 2003-338307 (claims and paragraphs 0013-0029).
Patent Document 3: Japanese Patent Application Publication No. 11-121044 (paragraphs 0004 and 0005).
Patent Document 4: Japanese Patent Application Publication No. 11-176476 (paragraphs 0004-0009).

(i) Patent documents 1 and 2 propose the following technique. In order to absorb the deforming stress of the electrode boards, a space portion is provided between two neighboring strip laminates of a group of flat wound electrode boards (flat wound electrode body). The two neighboring strip laminates are on the long axis line of a cross section perpendicular to the winding axis of the group of flat wound electrode boards.

According to this technique, since the space portion absorbs the deforming stress of the electrode boards, bending caused by swelling and contraction of the electrode boards is eliminated. However, with this technique, a spacer is used when preparing a cylindrical electrode body, and therefore, after pressing the body flat, the step of removing the spacer is required. It is difficult, however, to wind the electrode boards with the spacer on, presenting the problem of poor productivity.

(ii) Patent document 3 proposes the technique of using, as the adhesive for fixing the winding end of the cell element (wound electrode body), a material that swells, dissolves, or decomposes after contact with the electrolytic solution.

According to this technique, since the swelling, dissolution, or decomposition of the adhesive provides relaxation to the winding of the cell element, the stress applied on the constituents of the element is alleviated, thereby preventing associated deterioration of cell characteristics.

However, with this technique, the relaxed winding of the cell element causes a poor state of facing between the positive and negative electrode boards in the cell element. This interrupts the smooth progress of the charge-discharge reaction, presenting the problem of deteriorating cell characteristics such as cycle characteristics.

(iii) Patent document 4 proposes the technique of using, as the adhesive for fixing the cell element (wound electrode body), a material that, while substantially not dissolving or decomposing in the electrolytic solution, lowers its function of fixing the cell element after contact with the electrolytic solution.

According to this technique, since the function of fixing the cell element is lowered after the adhesive comes in contact with the electrolytic solution, and the winding of the cell element is thereby relaxed, the stress applied on the constituents of the element is alleviated, thereby preventing associated deterioration of cell characteristics. Also, this prevents contamination of the electrolytic solution which is caused by dissolution of the adhesive in the electrolytic solution. However, with this technique, similarly to the technique of patent document 3, there is a problem that cell characteristics such as cycle characteristics deteriorates.

SUMMARY OF THE INVENTION

In view of the foregoing and other problems, it is an object of the present invention to provide a cell that inhibits the bending of the electrode board caused by charging and discharging.

(1) In order to accomplish the above and other objects, a first embodiment of the present invention is configured as follows.

A method for producing a secondary cell having a flat wound electrode body, the method comprising the steps of: winding, by using a winding core, a positive electrode board, a negative electrode board, and a separator provided between the positive and negative electrode boards, and fixing a winding end, thereby preparing an approximately cylindrical electrode body; after the step of preparing the approximately cylindrical electrode body, deforming the approximately cylindrical electrode body into a shape with an oval cross section by pressing the approximately cylindrical electrode body from a direction perpendicular to an axis of winding, and rotating the deformed electrode body in the same direction as the direction of winding, thereby relaxing a state of winding; and after the relaxation step, pressing the electrode body into the flat wound electrode body.

This method includes deforming the approximately cylindrical electrode body with a fixed winding end into a shape with an oval cross section by pressing the body from a direction perpendicular to the axis of winding, and rotating the deformed electrode body in the same direction as the direction of winding. By this step, the state of winding of the electrode boards is relaxed without undermining the fixed state of the winding end of the electrode body. After this step, by pressing the deformed electrode body into a flat wound electrode body, the relaxation (clearance) is moved to the vicinity of the corner portion of the flat wound electrode body. When the electrode boards swell through charge-discharge cycling, they are deformed in a direction that the relaxation is filled, thereby preventing the bending of the electrode boards. This inhibits an increase in the thickness of the cell and the occurrence of a gap between the positive and negative electrode boards, even when charge-discharge cycling is repeated, thereby reducing deterioration of cycle characteristics.

In addition, since the fixed state of the winding end of the electrode body is not undermined, the state of facing between the positive and negative electrode boards is not undermined, either.

In addition, this method is simple in that after preparing an approximately cylindrical electrode body in a usual manner involving winding, the electrode body is rotated in the same direction as the direction of winding, and thus excellent in productivity.

The term "approximately cylindrical" is intended to include, as well as the shape of a round cylinder, the shape of an oval cylinder in which the ratio of the long axis to the short axis is within 1.5, and other shapes similar to the foregoing. As for the winding core used for winding, other than one with a round cross section, one with such a cross section can be used that the ratio of the long axis to the short axis is within 1.5.

In the above method, the relaxation step may be carried out after removing the winding core.

In the above method, the relaxation step may be carried out after reducing the diameter of the winding core.

In the relaxation step, where the electrode body is deformed into a shape with an oval cross section by being pressed from a direction perpendicular to the axis of winding, the winding core used for winding functions to interrupt such deformation. However, in the above two features, such a problem does not occur because a hollow or hole is left at the portion of the winding core used to winding.

To reduce the diameter of the winding core, it is possible to remove the winding core after winding and to place a winding core with a smaller diameter, or to use a winding core having a hollow and to, after winding, deform the winding core to fill the hollow or hole, thereby reducing the diameter of the winding core.

The above method may further comprise the step of: after the relaxation step and before the step of pressing the deformed electrode body into the flat wound electrode body, rotating the electrode body in the direction opposite the direction of winding, that is, in a direction of unwinding the electrode body, the opposite rotation step being carried out in such a state that the approximately cylindrical electrode body is deformed into a shape with an oval cross section by pressing the approximately cylindrical electrode body from a direction perpendicular to the axis of winding.

By carrying out the step of rotating the electrode body in the direction opposite the direction of winding after the step of rotating the electrode body in the same direction as the direction of winding, the relaxation (clearance) between the electrode boards at the corner portion of the flat wound electrode body after the pressing processing is enlarged. This further inhibits an increase in the thickness of the cell and deterioration of cycle characteristics.

The number of rotation in the direction opposite the direction of winding is preferably from 1 to 3.

In the above method, the relaxation step may comprise: sandwiching the electrode body between two parallel members for pressing the electrode body, thereby deforming the electrode body into a shape with an oval cross section; and with the two parallel members sandwiching the electrode body, rotating the deformed electrode body in the same direction as the direction of winding.

In the relaxation step, where the electrode body is deformed into a shape with an oval cross section by being pressed from a direction perpendicular to the axis of winding, if the feature of sandwiching the electrode body by two parallel members for pressing the electrode body is used, it is possible to prepare a flat wound electrode body at low cost and with ease.

In the above method, the two parallel members may be rotors.

If the two parallel members are rotors, the relaxation step is carried out with ease.

In the above step, the cross section of the flat wound electrode body cutting the flat wound electrode body from a direction perpendicular to the central axis of the flat wound electrode body meets the formula $D1/D2 \geqq 1.1$, where D1 is the shortest distance of the long axis of the cross section between the inner surface of the innermost layer of the flat wound electrode body and the outer surface of the outermost layer of the flat wound electrode body, and D2 is the shortest distance of the short axis of the cross section between the inner surface of the innermost layer of the flat wound electrode body and the outer surface of the outermost layer of the flat wound electrode body.

This feature will be described by reference to drawings. FIG. 1 is a view showing a flat wound electrode body of a cell according to the present invention. FIG. 1(*a*) is the cross section of the flat wound electrode body cutting it from a direction perpendicular the central axis of the flat wound electrode body. FIG. 1(*b*) is a partially enlarged view of FIG. 1(*a*).

In FIG. 1(*b*), D1 is the distance of the long axis of the flat wound electrode body between the inner surface A of the innermost layer of the wound electrode body and the outer surface B of the outermost layer of the wound electrode body. D2 is the distance of the short axis of the flat wound electrode body between the inner surface A and the outer surface C. An increase in the value of D1/D2 means an increase in relaxation 1*b* (clearance).

If D1/D2 is smaller than 1.1, relaxation 1*b*, which is present between the electrode boards at corner portion 1*a*, is excessively small, presenting a possibility of bending of the electrode boards. In view of this, D1/D2 is preferably 1.1 or larger, and more preferably 1.15 or larger.

In addition, the secondary cell may be a non-aqueous electrolyte secondary cell, and the negative electrode board may comprise a carbonaceous substance as an active material.

In a non-aqueous electrolyte secondary cell containing a carbonaceous substance as an active material, there is a large degree of swelling of the electrode boards caused by charging and discharging, and therefore, the advantageous effects of employing the present invention are best realized.

(2) In order to accomplish the above and other objects, a second embodiment of the present invention is configured as follows.

A method for producing a secondary cell having a flat wound electrode body, the method comprising the steps of; winding, by using a winding core, a positive electrode board, a negative electrode board, and a separator provided between the positive and negative electrode boards, and fixing the winding end, thereby preparing an approximately cylindrical electrode body; after the step of preparing the approximately cylindrical electrode body, reducing the diameter of the winding core and rotating the winding core in the same direction as the direction of winding so as to further wind the electrode boards and the separator located at an inner layer side of the wound electrode body, thereby relaxing the state of winding; and after the step of relaxation, pressing the electrode body into the flat wound electrode body.

This method includes reducing the diameter of the winding core and rotating the winding core in the same direction as the direction of winding. By this step, the electrode boards and the separator located at an inner layer side of the wound electrode body are further wound without undermining the fixed state of the winding end of the electrode body. This creates a gap between the inner layer side and outer layer side of the wound electrode body, and thus slightly relaxes the state of winding. After this step, by pressing the electrode body into a flat wound electrode body, the relaxation (clearance) is moved to the vicinity of the corner portion of the flat wound electrode body. As described above with respect to the first embodiment of the present invention, this prevents the bending of the electrode boards caused by charge-discharge cycling. As a result, an increase in the thickness of the cell is inhibited and deterioration of cycle characteristics is alleviated.

In addition, since the fixed state of the winding end of the electrode body is not undermined, the state of facing between the positive and negative electrode boards is not undermined, either.

In addition, this method is simple in that after preparing an approximately cylindrical electrode body in a usual manner involving winding, the diameter of the winding core is reduced and the winding core is rotated in the same direction as the direction of winding, and thus excellent in productivity.

In the above method, the relaxation step may comprise fixing an outermost layer of the wound electrode body, thereby keeping the outermost layer from being rotated.

If the relaxation step is carried out without fixing the outermost layer of the wound electrode body, it is feared that, following the rotation of the winding core, the outermost layer of the electrode body may be rotated in the direction of rotation of the winding core. In view of this, the relaxation step is preferably carried out while fixing the outermost layer of the wound electrode body and keeping the outermost layer from being rotated.

In the above method, the cross section of the flat wound electrode body cutting the flat wound electrode body from a direction perpendicular to the central axis of the flat wound electrode body may meet the formula $D1/D2 \geqq 1.1$, where D1 is the distance of the long axis of the cross section delimited by the inner surface of the innermost layer of the wound electrode body and the outer surface of the outermost layer of the wound electrode body, and D2 is the distance of the short axis of the cross section delimited by the inner surface of the innermost layer of the wound electrode body and the outer surface of the outermost layer of the wound electrode body.

In addition, the secondary cell may be a non-aqueous electrolyte secondary cell, and the negative electrode board may comprise a carbonaceous substance as an active material.

The advantageous effects of these features are the same as those described in the first embodiment of the present invention.

BRIEF DESCRIPTION OF THE DRAWINGS

FIG. 1(*a*) is the cross section of this flat wound electrode body and FIG. 1(*b*) is a partially enlarged view of FIG. 1(*a*).

FIG. 7(*a*) is the cross section of this flat wound electrode body and FIG. 7(*b*) is a partially enlarged view of FIG. 7(*a*).

FIG. 10(*a*) is a partial cross section of example 5 and FIG. 10(*b*) is a partial cross section of example 2.

DESCRIPTION OF THE PREFERRED EMBODIMENTS

Preferred embodiments of the present invention will be described by reference to the drawings in which a non-aqueous electrolyte secondary cell is taken as an example. It should be noted that the present invention will not be limited to the following embodiments, and that any modifications can be made without departing from the scope of the invention.

(Embodiment 1-1)

Figure 1:
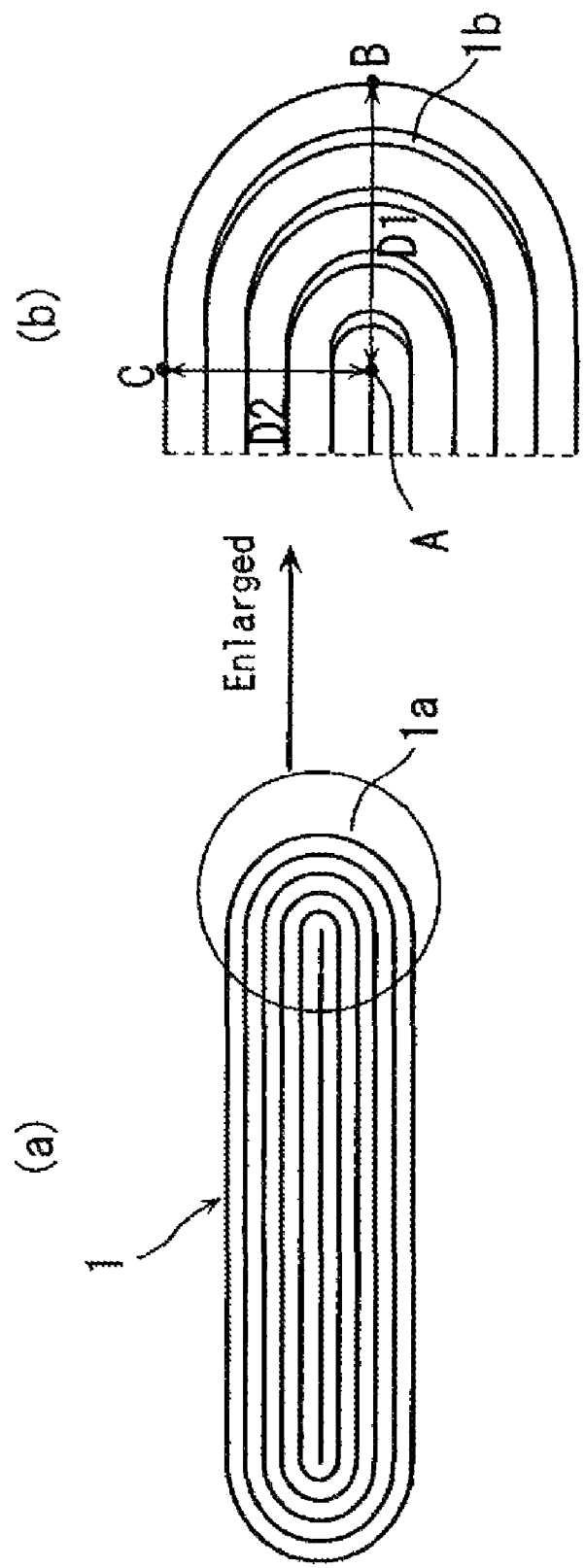
FIG. 1 is a view showing a flat wound electrode body of a cell according to the present invention.

Embodiment 1-1 belongs to the first embodiment of the present invention. FIG. 1 is a view showing a flat wound electrode body of a cell according to the present invention. FIG. 1(a) is the cross section of this flat wound electrode body and FIG. 1(b) is a partially enlarged view of the corner portion of this flat wound electrode body.

As shown in FIG. 1, flat wound electrode body 1 of the present invention has slight relaxation 1b (clearance) at corner portion 1a. The value of D1/D2 is 1.14.

This non-aqueous electrolyte secondary cell can be prepared by a known method with the use of known materials. For example, as the positive electrode material, lithium-containing transition metal compound oxide can be used such as lithium cobaltate, lithium nickelate, and lithium manganate. As the negative electrode material, carbonaceous substance such as graphite and coke, lithium alloy, and metal oxide can be used. As the non-aqueous solvent, carbonates such as ethylene carbonate and diethyl carbonate, esters such as γ-butyrolactone, and ethers such as 1, 2-dimethoxyethane can be used. As the electrolytic salt, $LiN(CF_3SO_2)_2$, $LiPF_6$, and the like can be used alone or in combination of two or more of the foregoing.

The present invention will be described in greater detail below by reference to examples.

EXAMPLE 1

<Preparation of Electrode Body>

Figure 2:
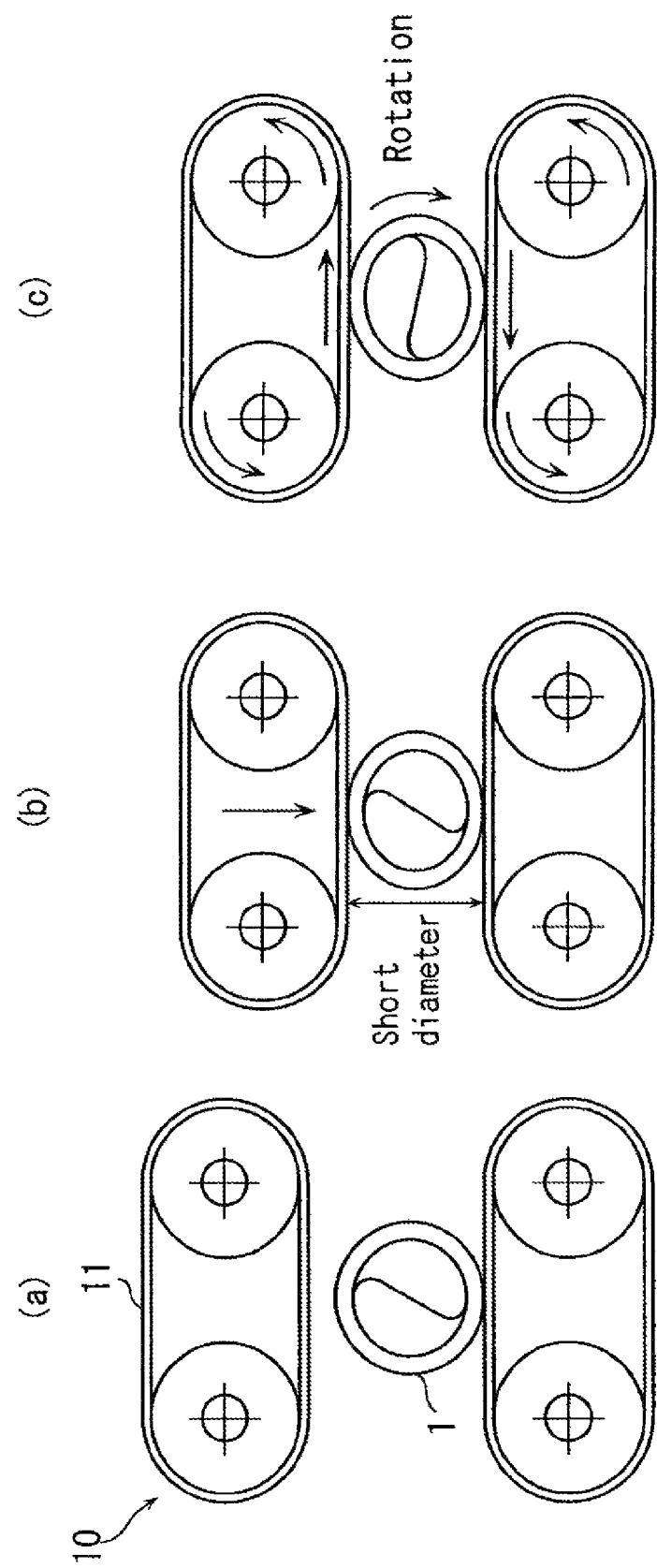
FIG. 2 is a schematic view of a relaxation processing apparatus used in the first embodiment of the present invention.
Figure 3:
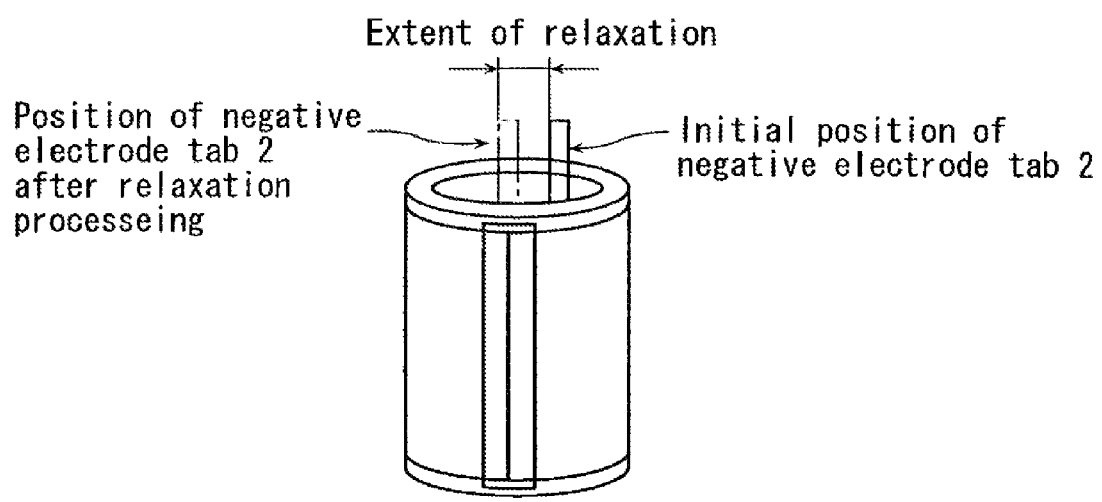
FIG. 3 is a perspective view showing the extent to which the negative electrode tab is moved by the relaxation processing.
Figure 4:
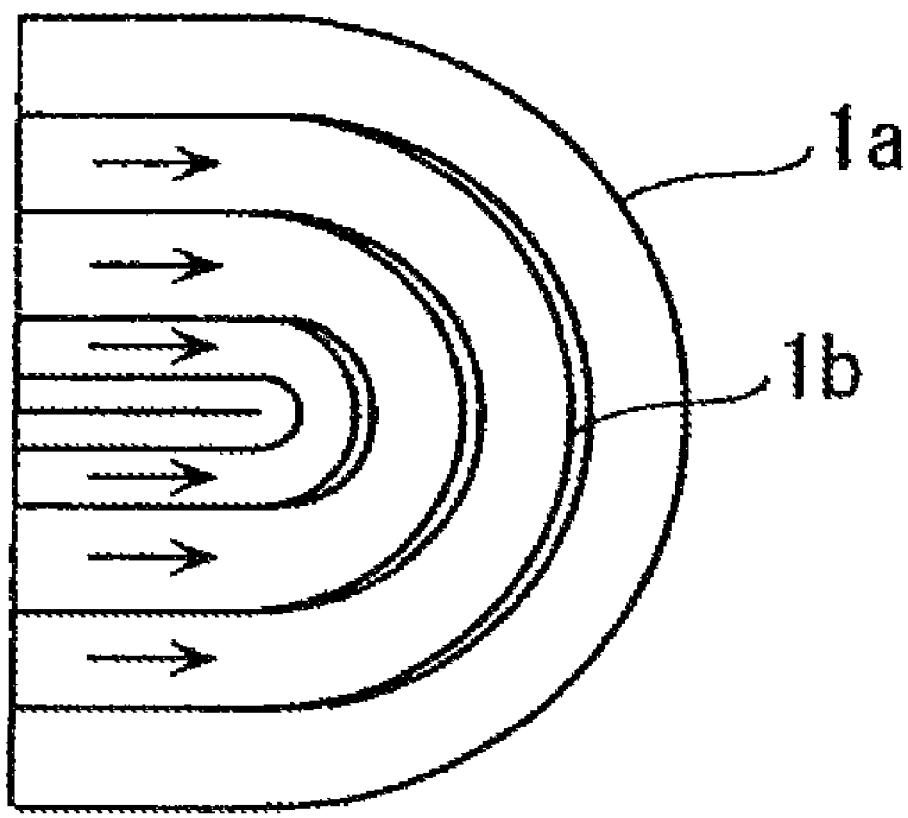
FIG. 4 is a schematic view showing how the electrode boards of the present invention swell.

Using a winding core with a round cross section, a positive electrode board obtained by a known method, a negative electrode board with negative electrode tab 2 attached thereto obtained by a known method, and a separator provided between the electrode boards were wound, and then the winding end was fixed with a tape, thus preparing cylindrical electrode body 1 (16.5 mm in diameter). After the winding core was removed from electrode body 1, as shown in FIG. 2, by using relaxation processing apparatus 10 having two rollers 11 placed in parallel, electrode body 1 was pressed to a shape having an oval cross section such that the short diameter was 15.0 mm (approximately 91% of the original diameter), and electrode body 1 was subjected to two cycles of rotation in the same direction as the direction of winding (relaxation processing). Here the distance (extent of relaxation) of movement of negative electrode tab 2 shown in FIG. 3 was 6.2 mm.

After this step, electrode body 1 was pressed from a direction perpendicular to the width direction of negative electrode tab 2, resulting in a flat wound electrode body. Then, the electrode body was inserted in an outer casing made of aluminum the size of which was 34.6 mm long×23.8 mm wide× 5.9 mm thick. The outer casing was then impregnated with a known electrolytic solution and sealed. Thus, five samples of the non-aqueous electrolyte secondary cell according to example 1 were prepared. The average value of D1/D2 was 1.14 (D1/D2 varied between 1.12 and 1.18).

COMPARATIVE EXAMPLE 1

Five samples of a non-aqueous electrolyte secondary cell according to comparative example 1 were prepared in the same manner as in example 1 except that no relaxation processing was carried out. The average value of D1/D2 was 1.05 (D1/D2 varied between 1.01 and 1.07).

<Tests for Increase in Cell Thickness>

Each cell prepared above was charged 0%, 50%, and 100%, and the thickness of each case was measured. The test results are shown in Table 1 below. The number of samples subjected to this test was 5 for each example.

<Tests for Increase in Cell Thickness Through Cycling>

Each cell prepared above was subjected to charge-discharge cycling under the conditions shown below. After 500 cycles of charging and discharging, each cell was charged 0% and 100%, and the thickness of each case was measured. The test results are shown in Table 1 below. The number of samples subjected to this test was 5 for each example.

<Conditions for Charge-Discharge Cycling>

Charging: carried out at a constant current of 1 I t (600 mA) to 4.2 V, and then at a constant voltage of 4.2 V for 2.5 hours in total.

Discharging: carried out at a constant current of 1 I t (600 mA) to 2.75 V.

<Cycle Characteristics>

After 500 cycles of charging and discharging, the discharging capacity of each cell was measured, and the cycle characteristics were measured from Formula 1 below. The test results (average values) are shown in Table 1. The number of samples subjected to this test was 3 for each example.

$$\text{Cycle characteristics}(\%) = (500\text{-cycle discharge capacity}/1\text{-cycle discharge capacity}) \times 100. \quad \text{(Formula 1)}$$

TABLE 1

|  | Charge state | Ex. 1 | Com. Ex. 1 | Difference |
|---|---|---|---|---|
| Initial thickness (mm) | 0% | 5.93 (5.91-5.96) | 5.95 (5.93-5.99) | 0.02 |
|  | 50% | 5.99 (5.97-6.00) | 6.02 (5.99-6.04) | 0.03 |
|  | 100% | 6.10 (6.08-6.11) | 6.19 (6.17-6.22) | 0.09 |
| Thickness after cycling (mm) | 0% | 6.33 (6.31-6.35) | 6.42 (6.39-6.45) | 0.09 |
|  | 100% | 6.46 (6.44-6.47) | 6.57 (6.53-6.61) | 0.11 |
| Cycle characteristics (%) |  | 90.1 | 87.2 | 2.9 |

In Table 1 above, the value before each parenthesis indicates an average value, and the values inside each parenthesis indicate variation.

From Table 1, it can be seen that the cells of example 1 are 0.02 to 0.11 mm thinner than the cells of comparative example 1.

Figure 5:
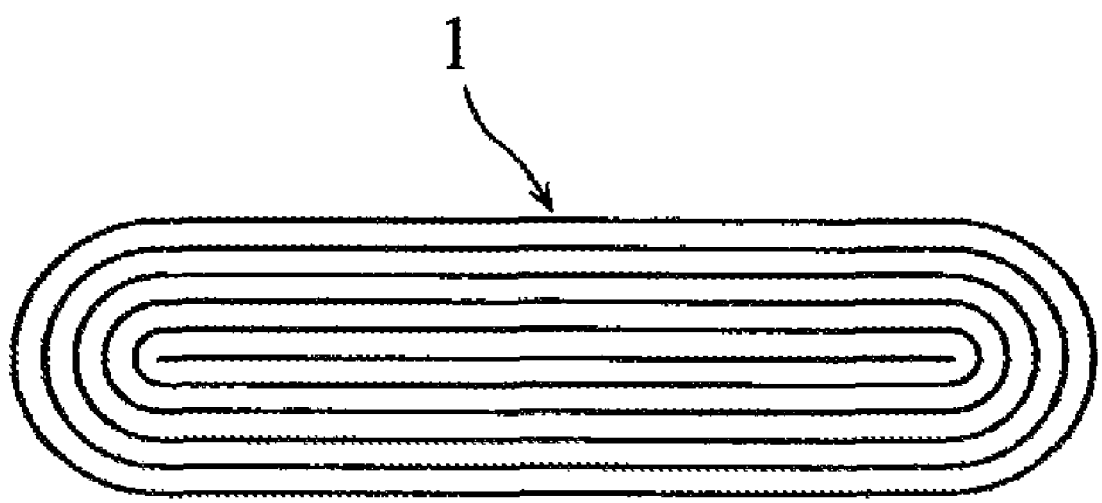
FIG. 5 is a cross section showing the flat wound electrode body of a cell of the present invention after fully charged.

This can be considered as follows. Since in example 1 the relaxation processing was carried out, there was relaxation 1b (clearance) between the electrode boards at corner portion 1a of the flat wound electrode body after being pressed, as shown in FIG. 1. Then, the electrode boards swelled in the direction that the space was filled. As shown in FIG. 5, the electrode boards therefore did not have any bending after being charged. Thus, there was no increase in cell thickness caused by bending.

Figure 7:
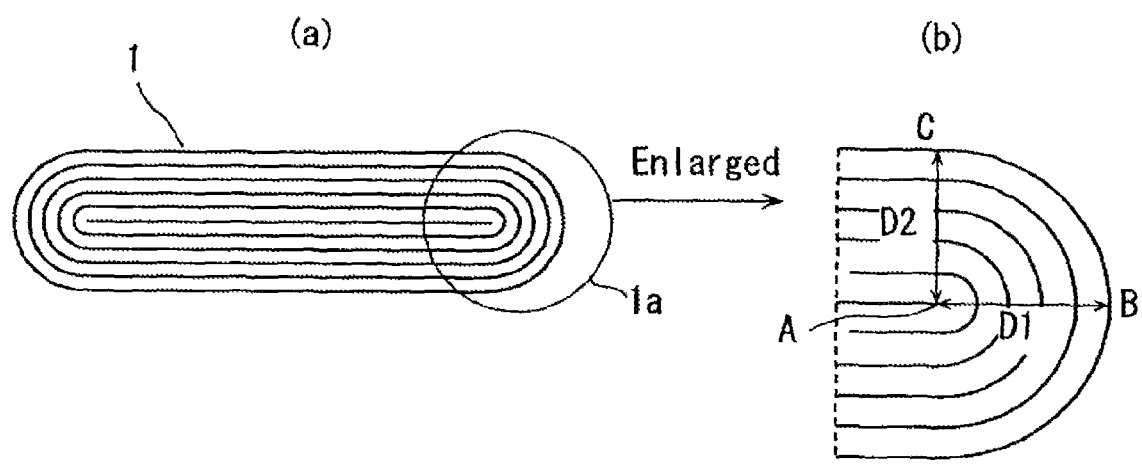
FIG. 7 is a view showing a flat wound electrode body of a cell according to comparative example 1.
Figure 8:
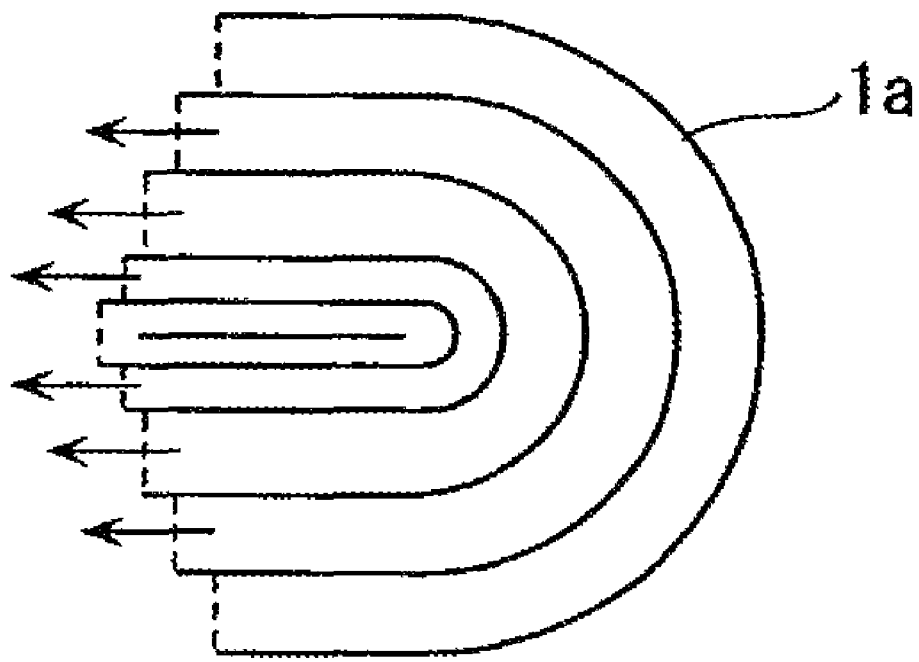
FIG. 8 is a schematic view showing how the electrode boards of comparative example 1 swell.
Figure 9:
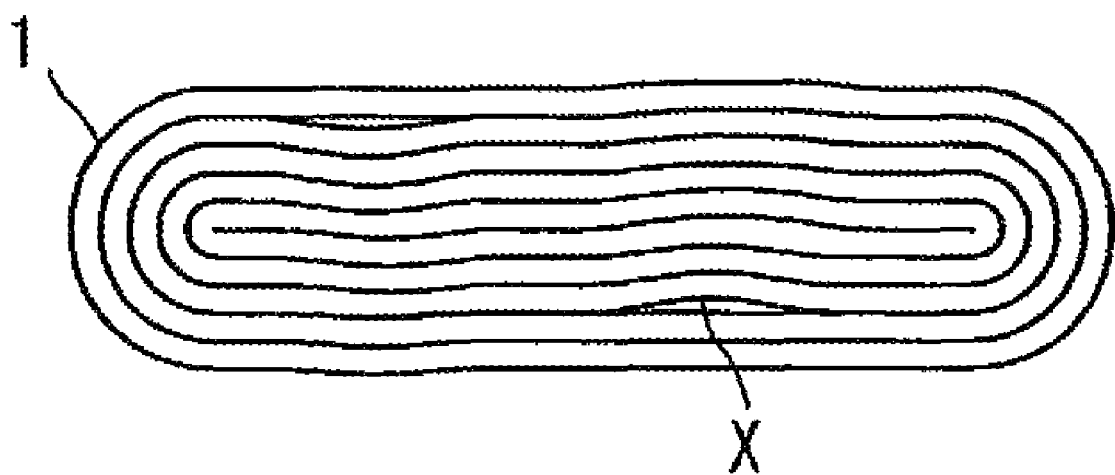
FIG. 9 is a cross section showing the flat wound electrode body of a cell of comparative example 1 after fully charged.

On the other hand, in comparative example 1, since no relaxation processing was carried out, there was no relaxation (clearance) between the electrode boards, as shown in FIG. 7. As shown in FIG. 8, because of the tape that fixed the winding end of the electrode body, the direction of swelling of the electrode boards was limited to the inward direction of the electrode body. This caused bending of the electrode boards as shown in FIG. 9. Because of this bending, cell thickness increased.

It can also be seen that the cycle characteristics of example 1 are 90.1%, 2.9 percentage points higher than 87.2% for comparative example 1.

This can be considered as follows. In example 1, the positive and negative electrode boards had no bending and were opposed to each other without spaces therebetween, as shown in FIG. 5. There was therefore smooth progress of charging and discharging, resulting in alleviated deterioration of cycle characteristics.

On the other hand, in comparative example 1, the electrode boards had bending as shown in FIG. 9, and there were spaces X at the bent portions between the positive and negative electrode boards. These spaces X interrupted the smooth progress of charging and discharging, resulting in increased deterioration of cycle characteristics.

(Embodiment 1-2)

Embodiment 1-2 belongs to the first embodiment of the present invention and is similar to embodiment 1-1 except that embodiment 1-2 further has the step of, after the relaxation step and before the step of pressing the deformed electrode body into the flat wound electrode body, rotating the electrode body in a direction opposite the direction of winding, the opposite rotation step being carried out in such a state that the approximately cylindrical electrode body is deformed into a shape with an oval cross section by pressing the approximately cylindrical electrode body from a direction perpendicular to the axis of winding. Detailed descriptions concerning the structure of the cell will not be provided. This embodiment will be described below by reference to examples.

EXAMPLE 2

As shown in FIG. 2, by using relaxation processing apparatus 10 having two rollers 11 placed in parallel, cylindrical electrode body 1 prepared in a manner similar to example 1 was pressed to a shape having an oval cross section such that the short diameter was 16.0 mm (approximately 97% of the original diameter), and electrode body 1 was subjected to eight cycles of rotation in the same direction as the direction of winding (relaxation processing). Then, electrode body 1 was subjected to one cycle of rotation in the direction opposite the direction of winding. Here the distance of movement of negative electrode tab 2 shown in FIG. 3 was 6.9 mm.

Thus, similarly to example 1, five samples of the nonaqueous electrolyte secondary cell according to example 2 were prepared. The average value of D1/D2 was 1.15 (D1/D2 varied between 1.13 and 1.18).

EXAMPLE 3

As shown in FIG. 2, by using relaxation processing apparatus 10 having two rollers 11 placed in parallel, cylindrical electrode body 1 prepared in a manner similar to example 1 was pressed to a shape having an oval cross section such that the short diameter was 16.0 mm (approximately 97% of the original diameter), and electrode body 1 was subjected to nine cycles of rotation in the same direction as the direction of winding (relaxation processing). Then, electrode body 1 was subjected to two cycles of rotation in the direction opposite the direction of winding. Here the distance of movement of negative electrode tab 2 shown in FIG. 3 was 7.0 mm.

Thus, similarly to example 1, five samples of the nonaqueous electrolyte secondary cell according to example 3 were prepared. The average value of D1/D2 was 1.16 (D1/D2 varied between 1.14 and 1.18).

EXAMPLE 4

As shown in FIG. 2, by using relaxation processing apparatus 10 having two rollers 11 placed in parallel, cylindrical electrode body 1 prepared in a manner similar to example 1 was pressed to a shape having an oval cross section such that the short diameter was 16.0 mm (approximately 97% of the original diameter), and electrode body 1 was subjected to ten cycles of rotation in the same direction as the direction of winding (relaxation processing). Then, electrode body 1 was subjected to three cycles of rotation in the direction opposite the direction of winding. Here the distance of movement of negative electrode tab 2 shown in FIG. 3 was 6.8 mm.

Thus, similarly to example 1, five samples of the nonaqueous electrolyte secondary cell according to example 4 were prepared. The average value of D1/D2 was 1.18 (D1/D2 varied between 1.15 and 1.20).

EXAMPLE 5

As shown in FIG. 2, by using relaxation processing apparatus 10 having two rollers 11 placed in parallel, cylindrical electrode body 1 prepared in a manner similar to example 1 was pressed to a shape having an oval cross section such that the short diameter was 16.0 mm (approximately 97% of the original diameter), and electrode body 1 was subjected to seven cycles of rotation in the same direction as the direction of winding (relaxation processing). Here electrode body 1 was not subjected to rotation in the direction opposite the direction of winding. Here the distance of movement of negative electrode tab 2 shown in FIG. 3 was 6.8 mm.

Thus, similarly to example 1, five samples of the nonaqueous electrolyte secondary cell according to example 5 were prepared. The average value of D1/D2 was 1.13 (D1/D2 varied between 1.11 and 1.17).

<Tests for Increase in Cell Thickness Through Cycling>

Each cell prepared above was subjected to charge-discharge cycling under the conditions shown below. After 500 cycles of charging and discharging, each cell was charged 0% and 100%, and the thickness of each case was measured. The test results are shown in Table 2 below.

<Conditions for Charge-Discharge Cycling>

Charging: carried out at a constant current of 1.08 I t (650 mA) to 4.2 V, and then at a constant voltage of 4.2 V for 2.5 hours in total.

Discharging: carried out at a constant current of 1.08 I t (650 mA) to 2.75 V.

<Cycle Characteristics>

After 500 cycles of charging and discharging, the discharging capacity of each cell was measured, and the cycle characteristics were measured from Formula 1 below. The test results (average values) are shown in Table 2. The number of samples subjected to this test was 5 for each example.

Cycle characteristics(%)=(500–cycle discharge capacity/1–cycle discharge capacity)×100.  (Formula 1)

TABLE 2

| | Charge state | Ex. 2 | Ex. 3 | Ex. 4 | Ex. 5 |
|---|---|---|---|---|---|
| Thickness after cycling (mm) | 0% | 6.31 (6.28-6.33) | 6.28 (6.26-6.29) | 6.25 (6.24-6.27) | 6.35 (6.32-6.37) |
| | 100% | 6.46 (6.43-6.48) | 6.42 (6.38-6.44) | 6.38 (6.36-6.40) | 6.51 (6.48-6.53) |
| Cycle characteristics (%) | | 88% | 88% | 89% | 86% |

In Table 2 above, the value before each parenthesis indicates an average value, and the values inside each parenthesis indicate variation.

It can be seen from Table 2 that in examples 2 to 4, which carried out rotation in the opposite direction of the winding direction after the rotation in the winding direction, the cell thickness after cycling was 0.04 to 0.10 mm thinner and the cycle characteristics were 2 to 3 percentage points higher than those in example 5, which belongs to embodiment 1-1 carrying out rotation only in the same direction as the winding direction.

Figure 10:
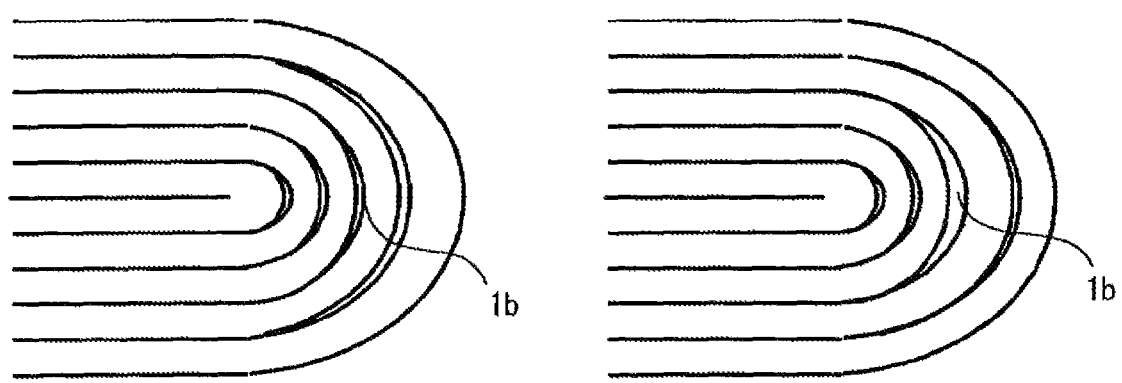
FIG. 10 is a view showing a flat wound electrode body of a cell according to the present invention.

This can be considered as follows. As described above, by carrying out the relaxation processing, as shown in FIG. 1, the flat wound electrode body after being pressed had relaxations 1b (clearance) at corner portion 1a (see FIG. 10(a)). By carrying out the step of rotation in the opposite direction of the winding direction after the relaxation processing, the above relaxations 1b (clearance) between the electrode boards were further enlarged (see FIG. 10(b)). This increased the effect of eliminating the bending of the electrode boards through charge-discharge cycling and further reduced the cell thickness, resulting in further improved cycle characteristics.

It should be noted that example 5 had greater cell thickness than example 1 and had deteriorated cycle characteristics, which was because example 5 was under more severe conditions for charge-discharge cycling than example 1 (1 I t for example 1 and 1.08 I t for example 5).

(Embodiment 2)

Next, embodiment 2 that belongs to the second embodiment of the present invention will be described. Because the structure and configuration of the cell according to embodiment 2 are similar to those in embodiment 1-1, the descriptions thereof will not be provided. Embodiment 2 will be described by reference to examples.

EXAMPLE 6

Using a winding core with a round cross section, a positive electrode board obtained by a known method, a negative electrode board with negative electrode tab 2 attached thereto obtained by a known method, and a separator provided between the electrode boards were wound, and then the winding end was fixed with a tape, thus preparing cylindrical electrode body 1 (19.7 mm in diameter) without removing the winding core.

Figure 11:
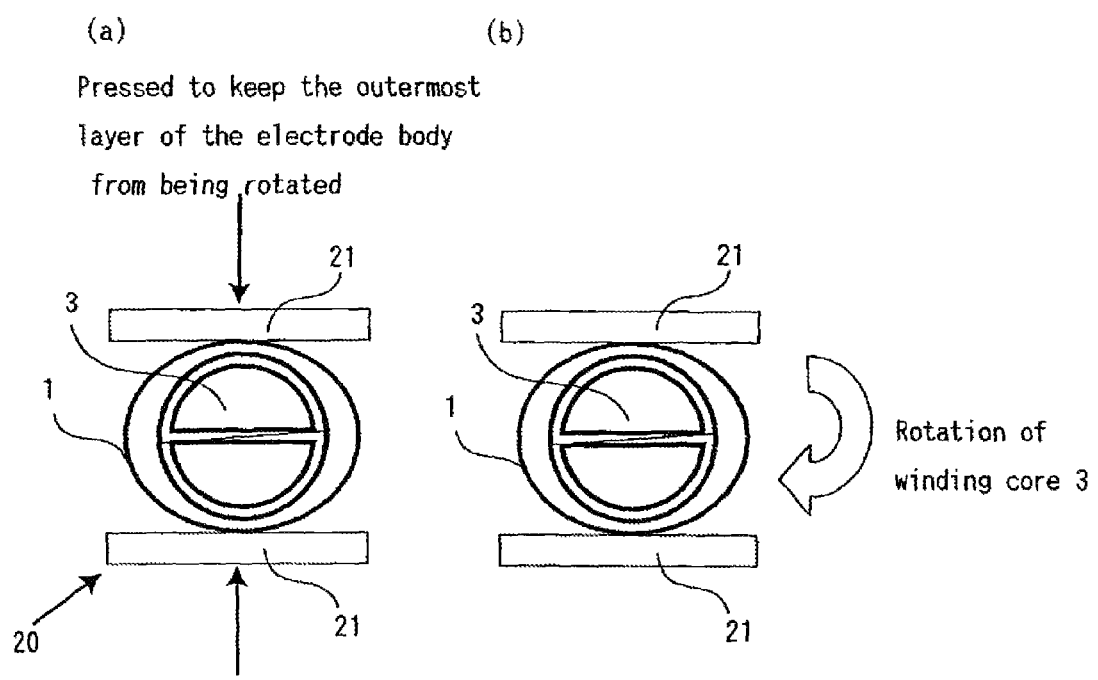
FIG. 11 is a schematic view of a relaxation processing apparatus used in the second embodiment of the present invention.

After this step, as shown in FIG. 11, by using relaxation processing apparatus 20 having two pressing boards 21 placed in parallel, electrode body 1 with winding core 3 therein was fixed by top and bottom pressing boards 21 for the electrode body as shown in FIG. 11(a), thereby closing winding core 3 by 0.5 mm (i.e., reducing the diameter of the winding core by 0.5 mm).

After this step, as shown in FIG. 11(b), with the outermost layer of the electrode body being fixed by top and bottom pressing boards 21, winding core 3 was subjected to a quarter cycle of rotation in the direction of winding to further wind the electrode boards and the separator located at the inner layer side of electrode body 1, thereby forming a space between the outer layer side and inner layer side of the electrode body (relaxation processing).

After this step, winding core 3 was removed, and electrode body 1 was pressed from a direction perpendicular to the width direction of negative electrode tab 2, resulting in a flat wound electrode body. Then, the electrode body was inserted in an outer casing made of aluminum the size of which was 35.5 mm long×33.7 mm wide×5.1 mm thick. The outer casing was then impregnated with a known electrolytic solution and sealed. Thus, a non-aqueous electrolyte secondary cell according to example 6 was prepared. The average value of D1/D2 was 1.18.

It can be seen from the above that by example 6 it is also possible to form relaxation (clearance) 1b at corner portion 1a of the flat wound electrode body.

This can be considered as follows. Because only the electrode boards and the separator located at the inner layer side of electrode body 1 are further wound without undermining the fixed state of the winding end of electrode body 1, a space was formed between the inner layer side and outer layer side of electrode body 1 and the state of winding was thereby relaxed. After this step, by pressing electrode body 1 into a flat wound electrode body, the relaxation (clearance) is moved to the vicinity of the corner portion of the flat wound electrode body.

It can be seen that similarly to embodiments 1-1 and 1-2, an increase in cell thickness caused by charge-discharge cycling is inhibited, and deterioration of cycle characteristics is inhibited.

(Supplementary Remarks)

The present invention can be applied to cells that use laminate outer casings.

Also, the present invention can be applied to cells that use solid electrolyte such as polymer electrolyte.

Instead of attaching a negative electrode tab to the negative electrode, a positive tab can be attached to the positive electrode.

The extent of relaxation at the relaxation processing can be adjusted to prevent bending through charge-discharge cycling taking into considerations the thickness of the electrode boards, the number of winding, and the amount of change in the thickness of the electrode boards through charging and discharging.

The amount of deformation by pressing at the relaxation processing is preferably within the range of from 70 to 97% of the diameter of the approximately cylindrical electrode body.

Figure 6:
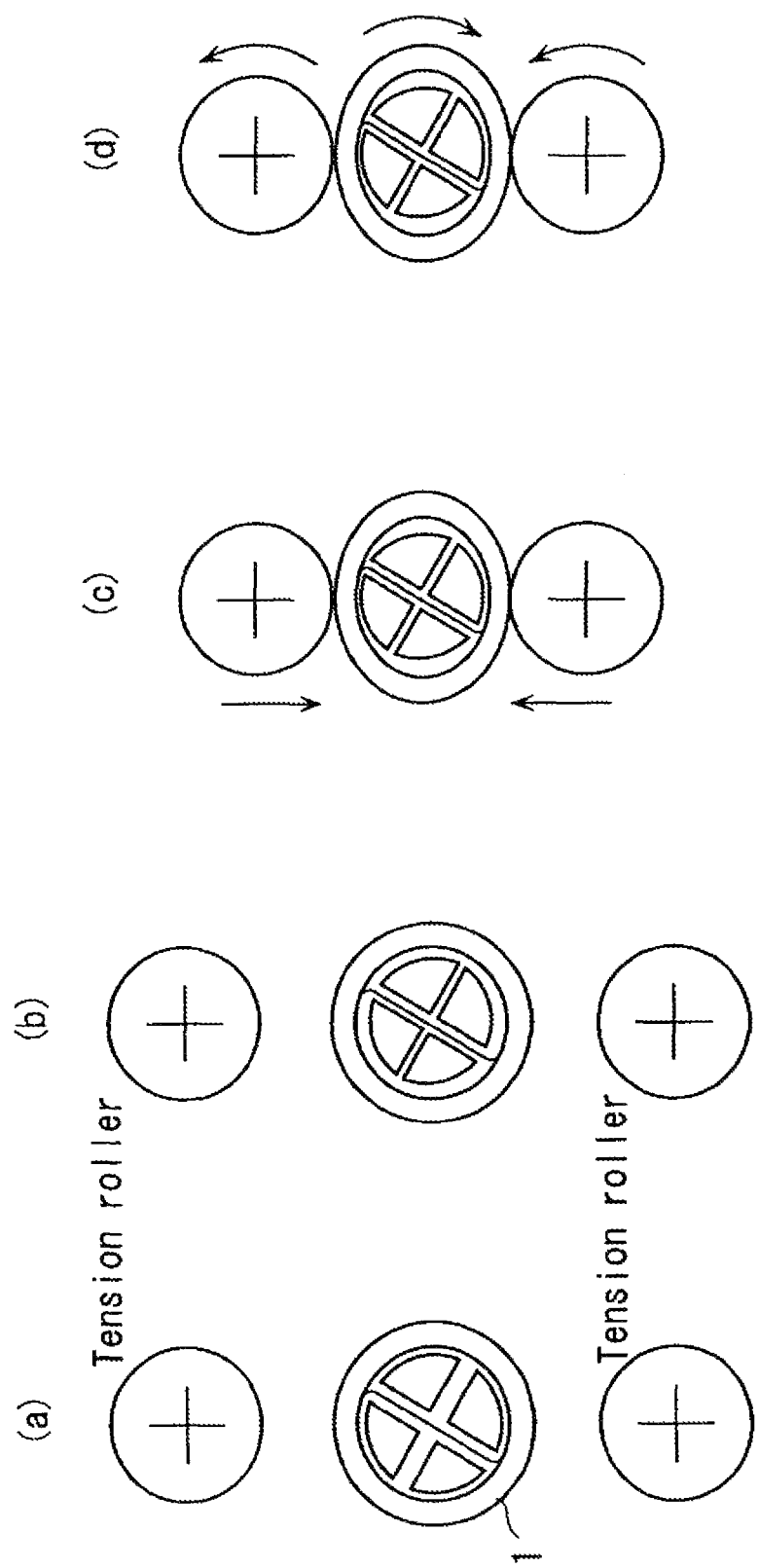
FIG. 6 is a schematic view showing other embodiments of the relaxation processing apparatus used in the first embodiment of the present invention.

In the first embodiment of the present invention, after the electrode body is wound with a winding core with a space therein as shown in FIG. 6, the space is closed to reduce the diameter of the winding core. Then, with the electrode body being pressed into a shape having an oval cross section with two tension rollers, the winding core is rotated in the direction of winding and the tension rollers move according to this rotation. The relaxation processing of the electrode body can be carried out in the above manner.

In addition, with any secondary cells with a flat wound electrode body and electrode boards whose volumes fluctuate through charging and discharging, sufficient advantageous effects are obtained from the production method of the present invention. While in the above examples lithium-ion cells were prepared, the present invention can be used for nickel cadmium storage cells, nickel hydrogen storage cells, and the like.

What is claimed is:

1. A method for producing a secondary cell having a flat wound electrode body, the method comprising the steps of:
winding, by using a winding core, a positive electrode board, a negative electrode board, and a separator provided between the positive and negative electrode boards, and fixing a winding end, thereby preparing an approximately cylindrical electrode body;
after the step of preparing the approximately cylindrical electrode body, reducing a diameter of the winding core and rotating the winding core in the same direction as the direction of winding so as to further wind the electrode boards and the separator located at an inner layer side of the wound electrode body, thereby relaxing a state of winding; and after the step of relaxation, pressing the electrode body into the flat wound electrode body.

2. The method for producing a secondary cell having a flat wound electrode body according to claim 1, wherein the relaxation step comprises fixing an outermost layer of the wound electrode body, thereby keeping the outermost layer from being rotated.

3. The method for producing a secondary cell having a flat wound electrode body according to claim 1, wherein a cross section of the flat wound electrode body cutting the flat wound electrode body from a direction perpendicular to a central axis of the flat wound electrode body meets a formula $D1/D2 \geqq 1.1$, where D1 is a shortest distance of a long axis of the cross section between an inner surface of an innermost layer of the flat wound electrode body and an outer surface of an outermost layer of the flat wound electrode body, and D2 is a shortest distance of a short axis of the cross section between the inner surface of the innermost layer of the flat wound electrode body and the outer surface of the outermost layer of the flat wound electrode body.

4. The method for producing a secondary cell having a flat wound electrode body according to claim 1, wherein:

the secondary cell is a non-aqueous electrolyte secondary cell; and the negative electrode board comprises a carbonaceous substance as an active material.

* * * * *